United States Patent
McIntyre et al.

(10) Patent No.: US 6,448,501 B1
(45) Date of Patent: Sep. 10, 2002

(54) ARMORED SPRING-CORE SUPERCONDUCTING CABLE AND METHOD OF CONSTRUCTION

(76) Inventors: Peter M. McIntyre, 611 Montclair, College Station, TX (US) 77840; Rainer H. Soika, 1 Hensel, #X4C, College Station, TX (US) 77840

( * ) Notice: Subject to any disclaimer, the term of this patent is extended or adjusted under 35 U.S.C. 154(b) by 0 days.

(21) Appl. No.: 09/281,121

(22) Filed: Mar. 29, 1999

Related U.S. Application Data

(60) Provisional application No. 60/081,008, filed on Mar. 30, 1998.

(51) Int. Cl.$^7$ ................................................ H01B 12/02
(52) U.S. Cl. ..................... 174/125.1; 174/15.5; 29/599
(58) Field of Search ............................ 174/125.1, 15.5; 335/216; 29/599; 505/231; 310/52

(56) References Cited

U.S. PATENT DOCUMENTS

| | | | | |
|---|---|---|---|---|
| 4,327,244 A | * | 4/1982 | Horvath et al. | .......... 174/125.1 |
| 4,336,420 A | * | 6/1982 | Benz | ........................ 174/125.1 |
| 4,912,443 A | * | 3/1990 | Heyne et al. | ............ 174/125.1 |
| 5,319,843 A | * | 6/1994 | Iverson et al. | ................ 29/599 |
| 5,932,523 A | * | 8/1999 | Fujikami et al. | ......... 174/125.1 |
| 6,066,599 A | * | 5/2000 | Otto et al. | ................ 174/125.1 |

* cited by examiner

*Primary Examiner*—Albert W. Paladini
(74) *Attorney, Agent, or Firm*—Simon, Galasso & Frantz PLC; Raymond M. Galasso; Stacy S. Cook

(57) ABSTRACT

An armored spring-core superconducting cable (12) is provided. The armored spring-core superconducting cable (12) may include a spring-core (20), at least one superconducting strand (24) wound onto the spring-core (20), and an armored shell (22) that encases the superconducting strands (24). The spring-core (20) is generally a perforated tube that allows purge gases and cryogenic liquids to be circulated through the armored superconducting cable (12), as well as managing the internal stresses within the armored spring-core superconducting cable (12). The armored shell (22) manages the external stresses of the armored spring-core superconducting cable (12) to protect the fragile superconducting strands (24). The armored spring-core superconducting cable (12) may also include a conductive jacket (34) formed outwardly of the armored shell (22).

26 Claims, 4 Drawing Sheets

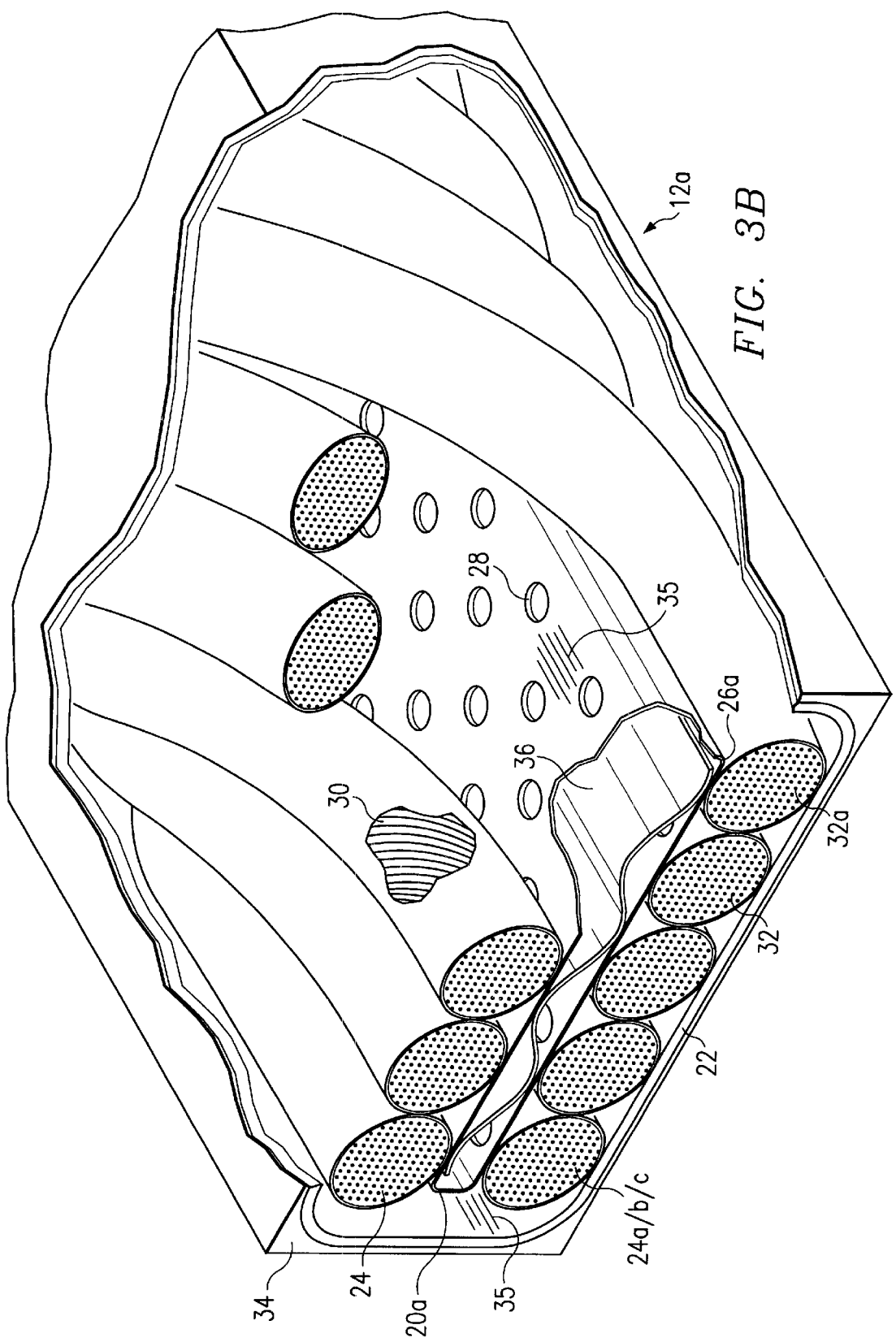

ARMORED SPRING-CORE SUPERCONDUCTING CABLE AND METHOD OF CONSTRUCTION

CROSS-REFERENCE TO RELATED APPLICATIONS

This application claims priority under 35 U.S.C. § 119(e) to provisional patent application Ser. No. 60/081,008, entitled Armored Spring-Core Cable for High-Temperature Superconductors, filed Mar. 30, 1998.

GOVERNMENT CONTRACT

This invention was invented under contract from the Department of Energy, contract number DE-FC-03-95ER40924.

TECHNICAL FIELD OF THE INVENTION

The present invention relates generally to superconductors, and more particularly to an armored spring-core superconducting cable and method of construction.

BACKGROUND OF THE INVENTION

Superconducting materials have the unique material property of having zero electrical resistance. In other words, superconducting materials can conduct electricity with no loss of energy. Superconducting materials exhibit this unique material property only when cooled below their respective critical temperature. Commercial applications of superconducting materials are generally limited to high temperature superconducting materials, which have a higher critical temperature than low temperature superconducting materials. High temperature superconducting materials, such as Bi-2212 and Bi-2223, are generally perovskites, a crystalline ceramic in which a combination of metal atoms are arranged in a crystal lattice containing planes of oxygen atoms. Each metal atom is chemically bonded to at least one oxygen atom, so that the overall material is an oxide ceramic. The superconducting material Bi-2212 has the chemical composition $Bi_{2+x}(Sr,Ca)_3Cu_2O_{8+d}$, and the superconducting material Bi-2223 has the chemical composition $Bi_{2+x}(Sr,Ca)_4Cu_3O_{10+d}$. The slight shifts x, d from integer composition refer to the empirical fact that the best properties are obtained when there is a slight excess of the indicated atom in the crystal.

In high-temperature superconductors, superconducting current flows in the planes of oxygen atoms within each crystal grain of the superconducting perovskite crystal. This leads to the necessity to achieve compaction of the grains within the conductor and alignment of the grains so that current can be transferred from grain to grain along the conductor.

The desired perovskite phase in high temperature superconductive materials, such as Bi-2212 and Bi-2223, is very difficult to form. If any of the fabrication conditions, such as the relative proportions of the several metal atoms, i.e., stoichiometry, the temperature cycle, and the oxygen content, vary from optimum conditions, other non-superconducting phases will be formed and the material will not be superconducting.

In many commercial applications, the superconducting material is packed into sheathes, i.e., tubes, of silver metal and the sheathes are formed into strands, either in the form of flat ribbons or round wires. The silver sheath, or silver matrix, contains the superconducting material while permitting oxygen to diffuse readily into and out of the silver sheath during the high-temperature heat treat when the reactions take place to form the superconducting phase. The best properties have been attained in superconducting strands that each contain many superconducting filaments of the superconducting material. A typical superconducting strand is formed by a multi-step procedure as follows.

Finely ground oxides or nitrates of the constituent metal atoms are mixed in the desired stoichiometry. When the oxides are used, they are mixed as finely ground solid powders. When the nitrates are used, each nitrate is dissolved to saturation in water, the saturated solutions are titrated in the desired ratio into a mixture solution, the solution mixture is evaporated or freeze dried or spray-evaporated to yield a nitrate powder mixture, and finally the nitrate powder mixture is baked at high temperature, typically at 600° C. for 12 hours, to evolve the nitrate and leave a uniformly dispersed oxide mixture. The oxide mixture is then sintered by baking at a high temperature, typically ~850° C., at which the oxide mixture reacts to form the desired perovskite phase.

The sintered material, consisting largely of the desired perovskite phases, is ground to a fine powder and packed into a silver sheath. A number of packed silver sheathes are combined and then cold worked, by drawing or roll pressing, to form a metallurgically bonded strand. The strand is further drawn or rolled to reduce its cross-sectional area to the desired size. In the case of Bi-2223, a further heat treat is performed, typically ~830° C. for more than 24 hours, to promote the growth of long filamentary crystals of the perovskite phase within each filament of the strand. The strand is then cold worked again to reduce porosity and increase the alignment of the crystal grains within each the superconducting filament. If the strand is to be formed into a superconducting coil, such as used electrical or electromagnetic devices, it may be wound into a superconducting coil in this state of processing, with electrical insulation provided to insulate adjacent turns within the coil.

The strand or coil is then subjected to a final precision heat treatment cycle in a strictly controlled atmosphere. In the case of Bi-2212, this final heat treat is again at ~830° C. in an atmosphere containing 20% oxygen for 6 days, in which the metal oxides diffuse and react to form large aligned grains of perovskite phase within each filament of superconducting material. The control of temperature and oxygen within the strand or coil during this final heat treatment is critical to the performance of the superconducting strand. In the case of Bi-2223, this final heat treat is at lower temperature, typically ~400° C., and has the purpose of relieving stress within the superconducting crystals and the silver sheath.

Superconducting strands may be used in any suitable electrical or electromagnetic device, such as electric motors, generators, energy storage devices, transformers, magnetic bearings, high strength magnets used in magnetic resonance imaging, and the like. Superconducting coils generally comprise one or more superconducting strands that are wound around a core. Electricity flowing through the superconducting strands produce a magnetic field within the core. The strength of the magnetic field can be increased by increasing the number of times the superconducting strand is wrapped around the core and by increasing the current flowing through the superconducting strand. As will be discussed in greater detail below, the magnetic field produces a physical load on each individual superconducting wire, which is generally referred to by those skilled in the art as Lorentz stress.

Lorentz stresses produce an operational, or mechanical, load that acts to push the individual windings of superconducting strands away from the core. Lorentz stresses are produced by the magnetic field acting on the superconducting materials. The maximum Lorentz stress within a coil increases by the square of magnetic field strength produced by that coil. The operational load is transferred outward from each winding to each outwardly successive winding of superconducting strands. The magnetic field strength of the superconducting coil is generally limited by the operational loads that the outermost superconducting strands can support. Accordingly, the number of layers of superconducting strands that can be wound in a coil of superconducting strands is limited by the operational load that can be supported by a superconducting strand before its current capacity is degraded, which in turn limits the strength of the magnetic field that can be achieved in a conventional superconducting coil.

A technical disadvantage of conventional superconducting strands is that the silver sheathes that contain the superconducting material are soft and have low tensile strength. The operational loading from Lorentz stress must be supported by the silver sheathes. For this reason the silver is sometimes hardened to increase the strength of the strand. The hardening is typically achieved either by alloying with other metals with the silver, or by dispersing an insoluble material, typically an oxide, such as $Al_2O_3$, in the silver. The alloy or dispersion hardening may substantially increase the cost of the silver, and accordingly increase the cost of the superconducting strand. Even hardened silver has only moderate tensile strength compared to structural metals like stainless steel and Inconel. Accordingly the strength of the silver sheathes may limit the magnetic field that can be achieved by the superconducting coil. Also the strength of the silver sheathes may limit the use of superconducting coils in applications where shock or vibration are present. Most A.C. electrical devices must operate under conditions of moderate to severe shock and vibration. Accordingly the mechanical strength of the support sheathes may limit the use of the superconducting strands in such applications.

Another technical disadvantage of conventional superconducting strands is that the superconducting material contained within each superconducting strand is extremely brittle and cannot support a large strain. The current capacity depends critically upon the continuity and connectiveness of the grains of superconductor within the superconducting filaments. Compressive or bending stresses produce strain within the ceramic crystals of the superconducting filament, that can easily break the superconducting filaments, and disrupt the flow of electrical current. Accordingly, superconducting coils are generally fabricated using superconducting strands that are wound into the desired shape prior to the final heat treatment cycle. The coil is typically impregnated with epoxy to provide uniform support and transfer of stresses within the superconducting coil. Even with these provisions, however, the accumulation of Lorentz stress through a thick coil may limit the magnetic field that can be generated before the superconducting material is degraded in its current capacity.

Another technical disadvantage of conventional superconducting strands is that it is difficult to attain optimal conditions in the final heat treat for a superconducting coil containing many layers of windings. As discussed previously, the conditions of temperature and atmosphere surrounding the superconducting material must be controlled within very tight tolerances, typically on the order of $\pm 2\%$ oxygen pressure and $\pm 2°$ C. temperature, of the optimal conditions in order for the superconducting material to attain optimal current capacity. In a superconducting coil containing many layers of windings, the outer windings of the superconducting coil form a barrier that prevents the internal superconducting strands from being exposed to the optimum conditions. Accordingly, the access to oxygen may be inhibited in the internal windings of a superconducting coil during heat treatment, and the superconducting material in the internal windings may not attain its optimal current capacity. Accordingly, the internal windings of superconducting strands often limits the current carrying capability of the superconducting coil.

Another technical disadvantage of conventional fabrication processes is that it is difficult to provide adequate refrigeration of the superconducting coil. In operation, conventional superconducting coils are generally bathed in cryogenic liquids, such as liquid nitrogen or helium, to maintain the temperature of the superconducting coil well below the critical temperature at which it would lose its superconducting properties. The internal windings of superconducting strands are not directly cooled by the cryogenic liquid. Heat can be generated within a coil for a number of reasons. In particular, in A.C. applications it is common to wind a superconducting coil using a cable containing several superconducting strands. In such applications, the alternating currents induce non-superconducting currents between the superconducting strands of the cable. Such currents pass through the silver sheathes, and accordingly generate heat through ohmic resistance. If refrigeration is provided by immersing the impregnated coil in a bath of liquid cryogen, the heat generated within the coil must be conducted to the outer bounds of the coil in order to be removed. This produces a temperature gradient, so that the inner portions of the coil may be heated to a higher temperature than the outer portions of the coil. Quench occurs if the superconductive material increases in temperature above the critical temperature and is no longer superconducting. When this occurs, the superconductive material has an electrical resistance and the current flowing through the superconducting strand produces heat, which in turn heats the surrounding superconducting strands above the critical temperature. The coil has energy stored in its magnetic field. If a quench began at one location in a coil, and slowly propagated to surrounding regions, most of the energy stored in the magnetic field would be transformed into heat in the region near where the quench began, and it could reach a sufficiently high temperature, approximately 300° C., wherein the epoxy impregnation would be irreversibly damaged. For this reason it is necessary to provide a means for forcing a quench to distribute throughout the coil once it begins at any location in the coil. Accordingly, the necessity for effectively controlling the quench of a superconducting coil restricts the number of windings in conventional superconducting coils, which limits the magnetic field strength that can be achieved in conventional superconducting coils.

A further disadvantage of conventional bath cooling of a superconducting coil is that the bath itself complicates the housing of the coil for many applications. In a motor or generator, for example, providing bath cooling of the coils would pose a major complication to the overall design of the device.

SUMMARY OF THE INVENTION

Accordingly, a need has arisen in the art for an improved superconducting cable. The present invention provides an armored spring-core superconducting cable and a method of construction that substantially eliminates or reduces problems associated with prior systems and methods.

In accordance with one embodiment of the present invention, an armored spring-core superconducting cable is provided. The armored spring-core superconducting cable comprises a spring-core, at least one superconducting strand wound onto the spring-core, and an armored shell that encases the superconducting strands. The spring-core preferably comprises a perforated tube that may have different cross sections, such as a circular or rectangular cross section. In an embodiment of a rectangular cross section spring-core, the spring-core includes a laminar spring that provides structural support to the tube. The superconducting strands may be fabricated in several different embodiments. For example, the superconducting strand may comprise a conventional superconducting strand with hardened silver matrix or a superconducting strand with pure silver matrix. The type of superconducting strand may be a round wire or a flat tape. In a particular embodiment, the armored spring-core superconducting cable also includes a conductive jacket formed outwardly of the armored shell. In another embodiment, an insulation layer is disposed between the spring-core and the superconducting strands, and the superconducting strands and the armored shell.

In accordance with another embodiment of the present invention, a superconducting coil for an electromagnetic device is provided. The superconducting coil comprises at least one armored spring-core superconducting cable wrapped around a core. The electromagnetic device using the superconducting coil may be a superconducting magnet, an electric motor, generator, energy storage device, or other suitable electromagnetic device.

In accordance with one implementation of the present invention, a method of constructing an armored spring-core superconducting cable is provided. In this implementation, a perforated tubular spring-core is provided. At least one superconducting strand is then wound onto the perforated tubular spring-core. The superconducting strands and the perforated tubular spring-core assembly are then encased within an armored shell to form the superconducting cable. In a particular implementation, the armored spring-core superconducting cable includes an insulation layer separating the superconducting strands from the spring-core on the inside, and the armored shell on the outside.

In accordance with one implementation of the present invention, a layer of low-resistance conductor, such as copper, may be attached to the outer surface of the armored shell, either as a surface coating on the armor shell or as a separate wire or strip that is wound along with the armored cable. The purpose of such conductor is to improve the stability of the magnet under quench conditions.

Technical advantages of the present invention include providing an armored spring-core superconducting cable that manages the various stresses within a superconducting coil. Internally generated stresses are managed by the spring-core and the external stresses are managed by the armored shell. Specifically, the spring-core preloads the superconducting strands within the armored spring-core superconducting cable and also deflects during operation to maintain the stress in the superconducting cables at a level far below the strain degradation limit of the superconducting material within the superconducting strands. In other words, the current carrying capacity of the superconducting material would be reduced if the strain in the superconducting material exceeded the strain degradation limit of the superconducting material. The armored shell protects the superconducting strands by transmitting the external stresses, such as the preload, Lorentz stresses from other armored spring-core superconducting cables, vibration, and shock, through the armored shell instead of through the superconducting strands. The stress management of the armored spring-core superconducting cable allows superconducting coils to be fabricated that can operate in stronger magnetic fields and with more tolerance of shock and vibration than conventional superconducting coils.

Another technical advantage of the present invention is that the armored spring-core superconducting cable allows precise control of the oxygen content in the superconducting coil during heat treatment of the superconducting strands, even in superconducting coils having many layers of windings. Heat treating the superconducting strands to produce a superconducting material within the superconducting strand requires precise control of the atmospheric conditions surrounding the superconducting strands. Purge gases can be circulated through the spring-core of the armored spring-core superconducting cable to maintain the optimal conditions throughout the superconducting coil during the heat treatment process. As a result, the superconducting material within each superconducting strand can be processed to achieve its optimum current capacity.

Another technical advantage of the present invention is that the temperature during the final heat treat can be controlled throughout the entire thickness of the superconducting coil, even for superconducting coils having many layers of windings. An electric current can be passed through the armored shell, spring-core, and/or the conductive jacket to resistively heat the superconducting coil uniformly throughout its cross-section. This provides a means to raise the temperature uniformly throughout the superconducting coil, without creating a temperature gradient between the outer and inner portions of the superconducting coil.

Another technical advantage of the present invention is that the armored shell, the spring-core, and the conductive jacket may be used to control the distribution of quench in the event that a quench originates anywhere in the superconducting coil. The armored shell, spring-core, and conductive jacket constitute electrically resistive current paths which are in parallel with the superconducting core of the cable and intimately coupled to it inductively. In the event that a region of the cable quenches, i.e., loses its superconducting property and becomes resistive, the current in the superconducting coil can be transferred through the armored shell, spring-core, and conductive jacket through inductive coupling. The current flowing in these parallel paths would produce resistive heating uniformly throughout the superconducting coil, driving the entire superconducting coil into a resistive state and preventing excessive heat from being deposited in the region where the quench began. Alternatively, upon detection that a quench had begun within the superconducting coil, an additional current could be applied to the armored shell, spring-core, and/or superconductive jacket to actively heat the entire superconducting coil into a resistive state and speed the process of energy dissipation.

Another technical advantage of the present invention is that the superconducting coil can be internally cooled by circulating cryogenic fluids through the spring-core of the armored spring-core superconducting cable. Because the cryogenic fluids are in intimate contact with all regions of each superconducting strand within the armored spring-core superconducting cable, the large heat of vaporization of the cryogen is available through local boiling to remove any heat that might be produced locally, for example because of A.C. losses in coils for A.C. applications, or because of a small region of a strand quenching in a high-field application. Depending upon the detailed design for a given application, this provision of enhanced cooling can actually make it impossible for a coil to quench, i.e., cryostability, so long as it is being adequately refrigerated. As a result, the superconducting coil can be fabricated with a greater number of windings of armored spring-core superconducting cables than is attainable in conventional superconducting coils. Accordingly, the superconducting coil can produce stronger magnetic fields as compared to conventional superconducting coils, and can be used in applications where shock or vibration are present or where there are sources of external heat.

Another technical advantage of the present innovation is that the oxygen required during the final heat treat of the coil is localized within the armored shell. It is generally necessary to provide an insulating material between adjacent windings in a superconducting coil. The insulation is installed as the coil is wound, and must be in place during the reaction bake. In many applications, it may be advantageous to form a conductive jacket onto the outside of the armored shell, in order to provide a parallel conducting path for coil current during quench. In both cases, if the insulation or the conductive jacket were exposed to oxygen at the temperature and for the duration of the final reaction bake, the properties of the insulator and/or the conductive jacket would be degraded by oxidation. By enclosing the superconducting strands within the armored shell and circulating the oxygen inside the armored shell, the insulation and the conductive jacket are effectively protected from the affects of the oxygen.

Other technical advantages will be readily apparent to one skilled in the art from the following figures, descriptions, and claims.

BRIEF DESCRIPTION OF THE DRAWINGS

For a more complete understanding of the present invention and its advantages thereof, reference is now made to the following description taken in conjunction with the accompanying drawings, wherein like reference numerals represent like parts, in which:

FIG. 3B is a perspective view of a schematic drawing in section with portions broken away illustrating the armored spring-core superconducting cable of FIG. 3A in accordance with the present invention.

DETAILED DESCRIPTION OF THE INVENTION

FIGS. 1 through 4B illustrate an armored spring-core superconducting cable and method of construction. As described in greater detail below, the armored spring-core superconducting cable comprises a number of superconducting strands contained between a spring-core and an armored shell. The spring-core helps manage the Lorentz stresses of the superconducting strands within the armored spring-core superconducting cable by preloading each superconducting strand. In addition, in an embodiment in which the spring-core comprises a perforated tube, the spring core provides an effective purge gas flow path during heat treatment of the superconducting strands. During operation, the perforated tubular spring-core provides a coolant flow path that directly cools the superconducting strands. The armored shell protects the superconducting strands from the external Lorentz stresses of the other armored spring-core superconducting cables by transferring the Lorentz stress load through the armored shell instead of through the fragile superconducting strands. The advantages of the armored spring-core superconducting cable allows superconducting coils to be constructed that can produce magnetic fields strengths that are unattainable with conventional superconducting strands.

Figure 1:
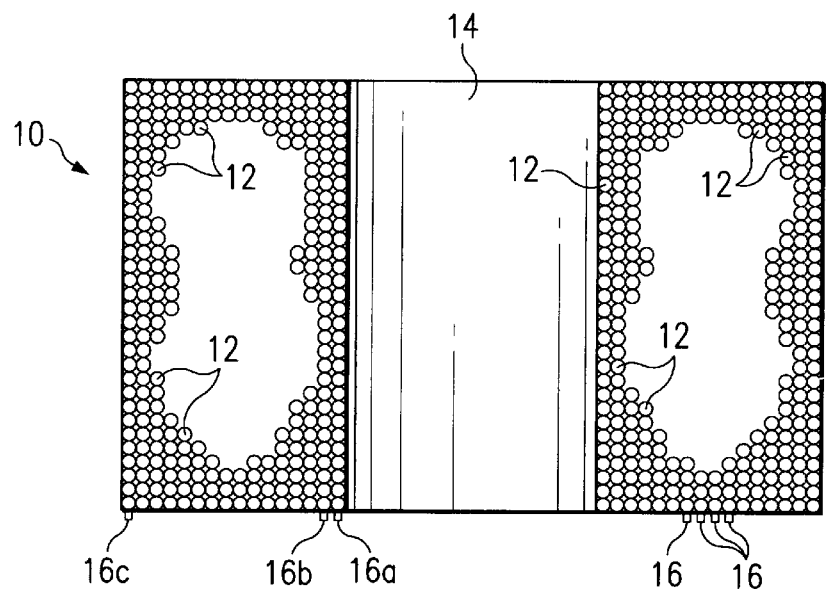
FIG. 1 is a perspective view of a schematic drawing in section with portions broken away illustrating a superconducting coil in accordance with the present invention.

FIG. 1 is a perspective view with portions broken away of a superconducting coil 10 comprising at least one armored spring-core superconducting cable 12 wrapped around a core 14, wherein each wrapping of the armored spring-core superconducting cable 12 forms a winding 16. After heat treating the superconducting coil 10, the windings 16 may be epoxy impregnated so that the voids between individual armored spring-core superconducting cables 12 are filled.

The superconducting coil 10 produces a magnetic field within the core 14 that may be used for various electric and electromagnetic applications. For example, in electric motor applications, a rotor (not expressly shown) is located in the core 14 and the magnetic field produced within the core 14 acts on the rotor to rotate the rotor. Although the armored spring-core superconducting cable 12 is illustrated in terms of the superconducting coil 10, it shall be understood that the armored spring-core superconducting cable 12 may be used in any suitable application without departing from the scope of the present invention. For example, the armored spring-core superconducting cable 12 may be used in high-energy switching equipment, high-energy transmission systems, and any other suitable application.

The number of windings 16 and the amount of electricity that flows through the armored spring-core superconducting cables 12 determines the strength of the magnetic field produced by the superconducting coil 10. Specifically, the greater the electrical current passing through the armored spring-core superconducting cables 12 and the greater the number of armored spring-core superconducting cables 12 wound around the core 14, the greater the strength of the magnetic field produced by the superconducting coil 10.

The magnetic field produces an operational load on the each armored spring-core superconducting cable 12 that increases in proportion to the magnetic field acting on the armored spring-core superconducting cable 12 and the electrical current carried by the armored spring-core superconducting cable 12. The operational load, or Lorentz stress, is a mechanical force acting on each armored spring-core superconducting cable 12 to push the armored spring-core superconducting cable 12 away from the core 14. The innermost winding 16a of armored spring-core superconducting cables 12 only supports the operational load produced by the innermost winding 16a. The winding 16b that is adjacent the innermost winding 16a supports the operational load produced by winding 16b and also the operational load produced by the innermost winding 16a. The operational loads accumulate in each successive winding 16, with the outermost winding 16c responsible for reacting the total accumulated operational load. The structural strength of the armored spring-core superconducting cable 12 limits the magnetic field strength that can be attained in the superconducting coil 10. Accordingly, the greater the structural strength of the armored spring-core superconducting cable 12, the greater the magnetic field strength that can be produced by the superconducting coil 10.

Figure 2A:
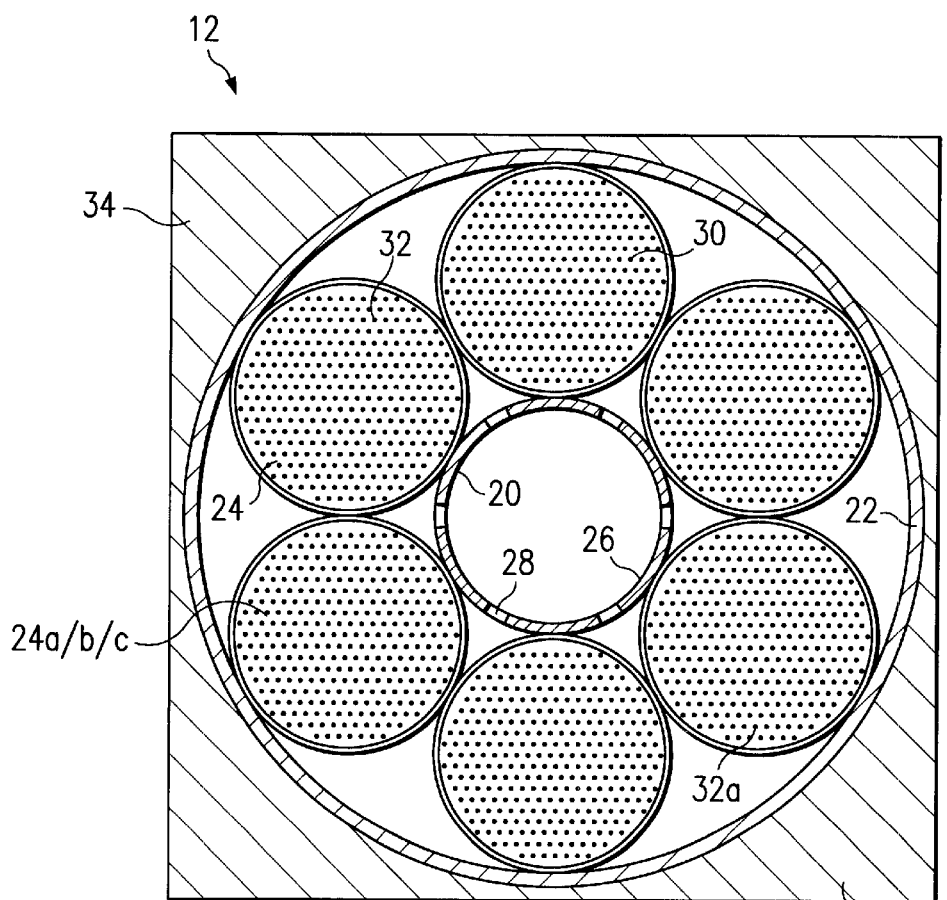
FIG. 2A is a cross sectional view of an armored spring-core superconducting cable in accordance with the present invention.
Figure 2B:
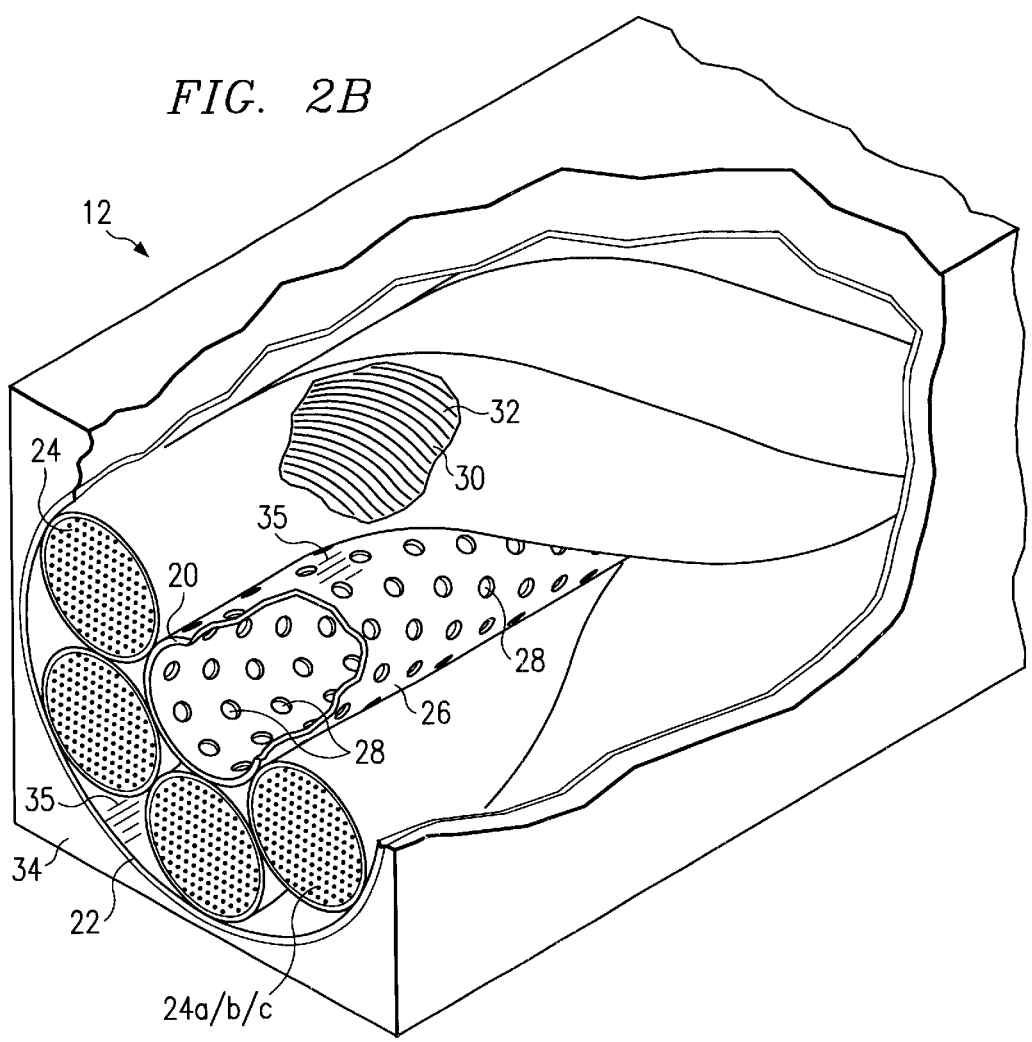
FIG. 2B is a perspective view of a schematic drawing in section with portions broken away illustrating the armored spring-core superconducting cable of FIG. 2A in accordance with the present invention.

FIGS. 2A and 2B illustrates one embodiment of the armored spring-core superconducting cable 12. In this embodiment, the armored spring-core superconducting cable 12 comprises a spring-core 20, an armored shell 22, and at least one superconducting strand 24 disposed between the spring-core 20 and the armored shell 22. The armored spring-core superconducting cable 12 is illustrated with six superconducting strands 24 circumferentially spaced and wound around the spring-core 20, however, the number of superconducting strands 24 may be increased or decreased without departing from the scope of the present invention. In addition, although the superconducting strands 24 are illustrated as cylindrical wires, the superconducting strands 24 may also be ribbon superconducting strands, as described in greater detail below, or any other suitable configuration of superconducting strand.

The spring-core 20 operates to preload and manage the internal stresses, i.e., the Lorentz and preload stresses, of the superconducting strands 24 located within the armored spring-core superconducting cable 12. The spring-core 20 compressively preloads the superconducting strands 24 between the spring-core 20 and the armored shell 22. In addition, the superconducting strands 24 preferably contact one another laterally to further preload the superconducting strands 24. Compression preloading prevents the superconducting strands 24 from moving during operation and also helps transmit the operational loads from each superconducting strand 24 to the armored shell 22. The spring-core 20 deflects to maintain the stress load in the superconducting strands 24 within acceptable limits. In other words, the spring-core 20 continuously deflects to prevent the preload and the operational loads in the superconducting strands 24 from damaging the superconducting material within superconducting strands 24.

In the embodiment illustrated, the spring-core 20 comprises a circular cross sectional tube 26 having perforations 28 through the wall of the tube 26. As will be described in greater detail below, the spring-core 20 may comprise other suitable configurations, including different cross sections, such as a rectangular cross sectional tube described below, and different forms, such as a solid core (not expressly shown). In this embodiment, the perforations 28 in the tube 26 allow purge gases to be continuously fed through the armored spring-core superconducting cable 12a during heat treatment. This allows the optimum conditions for producing superconducting materials within the superconducting strands 24 to be maintained, even in superconducting coils 10 having numerous tightly wound windings 16. Accordingly, the superconducting strands 24 in the armored spring-core superconducting cable 12 have a greater current carrying capability than conventionally fabricated superconducting strands.

In addition, the spring-core 20 provides a coolant circulation path for directly cooling the superconducting strands 24 during operation. Specifically, cryogenic fluids, such as liquid nitrogen or helium, can be circulated through the spring-core 20 during operation. The perforations 28 in the tube 26 allows the cryogenic fluids to intimately contact and cool the superconducting strands 24. The direct coolant circulation path allows complex and tightly wound superconducting coils 10 to be quenched without damaging the superconducting coil 10. Furthermore, the cryogenic fluid can be circulated under pressure through the armored spring-core superconducting cable 12. The pressurized cryogenic fluid help prevent vaporization of the cryogenic fluid during quenching. In some applications, the direct coolant circulation path will negate the need for complex cryogenic cooling baths or jackets to maintain the temperature of the superconducting coil 10 below the critical temperature of the superconducting material. In particular, cryogenic cooling baths or jackets are not commercially practical in many electric motor and generator applications. Accordingly, internal cryogenic cooling is a necessity in many commercial applications.

The spring-core 20 may be fabricated by any suitable process. For example, the spring-core 20 may be fabricated by laser drilling patterns of perforations 28, i.e., holes, through the wall of the tube 26. The spring-core 20 may also be fabricated by spiral winding a strip of thin metal. The spring-core 20 is fabricated from a metal, such as Inconel X750, that can be spring tempered and that can withstand the heat treat of the superconducting cable 12, on the order of 850° C. in an oxygen atmosphere, without losing its spring temper.

The armored shell 22 encases the superconducting strands 24 after the superconducting strands 24 have been wound onto the spring-core 20. The armored shell 22 intercepts and transfers all Lorentz and preload stresses from one winding 16 to the next winding 16 without transferring the stresses through the fragile superconducting strands 24. In this manner, the external stresses bypass the fragile superconducting strands 24 and the superconducting strands 24 only experience the stresses associated with their own Lorentz stress loads. The thickness and strength of the armored shell 22 depends upon the superconducting coil 10 to be constructed. For example, a superconducting coil 10 with a large number of windings 16 that produces a very strong magnetic field will require a stronger armored shell 22 than a superconducting coil 10 with few windings and a relatively weak magnetic field.

The armored shell 22 generally comprises a high-strength alloy, such as Inconel 718, that can retain its strength even through the final heat treat in oxygen atmosphere. The armored shell 22 may be fabricated by any suitable process. For example, in one process, the armored shell 22 is fabricated by passing the superconducting strands 24 and spring-core 20 assembly through an armored shell tube (not expressly shown), and then drawing down the armored shell tube onto the superconducting strands 24 using conventional drawing or rolling processes until the armored shell 20 compresses the superconducting strands 24 onto the spring-core 20. In another process, the armored shell 22 is formed around the superconducting strands 24 by forming a strip of suitable metal into a cusp, bringing it onto the outside of the superconducting strands 24, and gradually closing the cusp to form a tube with an open seam, using a succession of rolling operations. The seam is then hermetically sealed by welding to form the armored shell 22. A strip of thermally insulating material and a strip of thin metal are generally enclosed beneath the seam to protect the superconductive strands 24 from the heat of the welding process.

The fabrication of the armored shell 22 around the superconducting strands 24 produces the compressive preload in the superconducting strands 24. Conventional superconducting strands often utilize hardening alloys in the silver used in the fabrication of superconducting strands 24. As a result, the operational loads that the superconducting strands 24 can tolerate are substantially less than the operational loads that the superconducting strands 24 within the armored spring-core superconducting cable 12 can tolerate. Accordingly, the superconducting coil 10 can constructed with more windings 16 and can achieve higher magnetic field strengths than conventional superconducting coils.

Each superconducting strand 24 comprises a number of superconducting filaments 30 of a superconducting material. The superconducting material forming the superconducting filaments 30 is generally a high temperature superconducting material. High temperature superconducting materials have a generally crystalline ceramic structure and are very sensitive to loads. For this reason, most high temperature superconducting materials are activated after they have been formed into their final shape due to their inability to react loads. The superconducting strands 24 may be fabricated in several different embodiments, such as a conventional superconducting strand 24a, a silver matrix superconducting strand 24b, a ribbon superconducting strand 24c. It will be understood that the superconducting strands 24 may comprise other suitable types of superconducting strands without departing from the scope of the present invention.

Conventional superconducting strands 24a are fabricated through a series of extrusions and heat treatments. As described previously, a mixture of metal oxides or nitrates are packed into an alloy hardened silver sheath. The silver sheathes are alloy hardened with such materials as manganese or zirconium, or by dispersing an insoluble material, typically an oxide, such as $Al_2O_3$, in the silver. A number of packed silver sheathes are combined and then cold worked, by drawing or roll pressing, to form a metallurgically bonded strand. The bonded strand is further drawn or rolled to reduce its cross-sectional area to the desired size. The completed bonded strand may include several hundred individual filaments of metal oxide or nitride. The bonded strand is then heat treated to promote the growth of long filamentary crystals of the perovskite phase within each filament of the bonded strand. The superconducting bonded strand is then cold worked again to reduce porosity and increase the alignment of the crystal grains within each the superconducting filaments. In conventional superconducting coils, the superconducting bonded strand is wound into the final shape of the superconducting coil in this state of processing, with electrical insulation provided to insulate adjacent turns within the superconducting coil. The conventional superconducting coil is then subjected to a final precision heat treatment cycle in a strictly controlled atmosphere, typically 850° C. in an atmosphere containing 20% oxygen for 6 days, in which the metal oxides or nitrides diffuse and react to form large aligned grains of perovskite phase within each superconducting filament of each superconducting strand.

Silver matrix superconducting strands 24b are fabricated as described above, with the exception that the silver sheathes do not contain hardening alloys that contaminate the metal oxides. In particular, because conventional superconducting coils are often constructed only with superconducting strands, the superconducting strands must be capable of withstanding the preload and the operational loads. As a result, conventional superconducting strands include various hardening alloys to increase the strength of the superconducting strand. The hardening alloys often used in conventional superconducting strands produce free metal ions that interfere with the formation of superconducting materials. Accordingly, the amount of superconducting material formed within each superconducting filament is reduced by the amount of contamination. Silver matrix superconducting strands 24b are fabricated using pure silver sheathes, or silver sheathes alloyed with materials, such as aluminum, that do not interfere with the formation of superconducting materials. The silver matrix superconducting strands 24b generally have weaker material properties than conventional superconducting strands 24a, however, because the external stresses of the superconducting coil 10 are transferred through the armored shell 22, the silver matrix superconducting strands 24b can be used to obtain the higher current capacity associated with silver matrix superconducting strands 24b.

The armored spring-core cable 12 may also include a conductive jacket 34 disposed outwardly from the armored shell 22. In one embodiment, the conductive jacket 34 comprises pure copper, i.e., oxygen free high conductivity copper, that is formed on the outer surface of the armored shell 22. The shape of the conductive jacket 34 can be optimized to fill the geometry of the armored spring-core superconducting cable 12. For example, for an armored spring-core superconducting cable 12 having a circular cross section, the conductive jacket 34 may be formed with a square geometry to facilitate winding the armored spring-core superconducting cable 12 into the superconducting coil 10. In addition, the geometry effectively fills the voids between armored spring-core superconducting cables 12 and effectively stiffening the superconducting coil 10.

The conductive jacket 34, in addition to the spring-core 20 and the armored shell 22, provides an electrically conductive path for the electricity flowing through the armored spring-core superconducting cable 12 during a quench. In other words, during a quench, the superconducting material within the superconducting strands 24 is no longer superconductive and becomes a resistive ceramic. The electricity flowing through the superconducting strands 24 must be effectively transmitted past the affected region without damaging the superconducting strands 24 or the other components of the armored spring-core superconducting cable 12. The conductive jacket 34 provides a parallel path for the electricity and helps prevent damage to the armored spring-core superconducting cable 12 during quench.

The armored spring-core superconductive cable 12 may also include an insulation layer 35. The insulation layer 35 may be disposed between the spring-core 20 and the superconducting strands 24, and the superconducting strands 24 and the armored shell 22, either individually or together. In other words, the insulation layer 35 may only be disposed between the spring-core 20 and the superconducting strands 24, the insulation layer 35 may be disposed between the superconducting strands 24 and the armored shell 22, or the insulation layer 35 may be disposed between the spring-core 20 and the superconducting strands 24 and between the superconducting strands 24 and the armored shell 22. The insulation layer 35 inhibits the diffusion of metal atoms from the spring-core 20 and/or the armored shell 22 through the silver matrix into the superconducting material. In one embodiment, the insulation layer 35 comprises a thin sheet of magnesium oxide. In another embodiment, the insulation layer 35 comprises a surface coating of a sol-gel containing $Zr_2O_3$.

In applications in which the armored spring-core superconducting cable 12 is to be used in electrical and electromagnetic devices, the armored spring-core superconducting cable 12 is typically wound into the requisite shape of the superconducting coil 10. The superconducting coil 10 is then heat treated to form continuous superconducting filaments 30 of superconducting material within the superconducting strands 24. These superconducting filaments 30 have a current carrying capacity that is greater than conventional superconducting filaments. Accordingly, the superconducting coil 10 can produce magnetic field strengths that cannot be obtained with conventional superconducting coils.

Figure 3A:
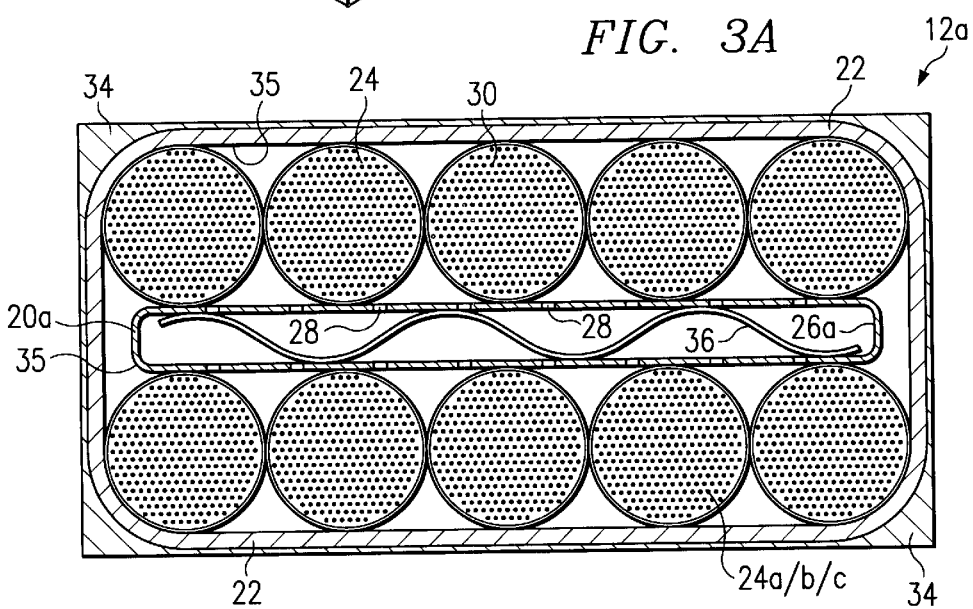
FIG. 3A is a cross sectional view of an armored spring-core superconducting cable in accordance with another embodiment of the present invention.

FIGS. 3A and 3B illustrate an armored spring-core superconducting cable 12a in accordance with another embodiment of the present invention. The armored spring-core superconducting cable 12a is similar to the armored spring-core superconducting cable 12. The armored spring-core superconducting cable 12a includes a spring-core 20a having a rectangular cross sectional tube 26a. The rectangular cross section of the spring-core 20a allows the armored spring-core superconducting cable 12a to be fabricated in the configuration of flat strips or ribbon. In a particular embodiment, the spring-core 20a includes a laminar spring 36 located within the spring core 20a. The laminar spring 36 supports the tube 26a to prevent the tube 26a from collapsing. In addition, the laminar spring 36 provides an even preload to the superconducting strands 24. The ribbon configuration of the armored spring-core superconducting cable 12a allows the armored spring-core superconducting cable 12a to be used in various configurations that do not lend themselves to the armored spring-core superconducting cable 12.

Figure 4A:
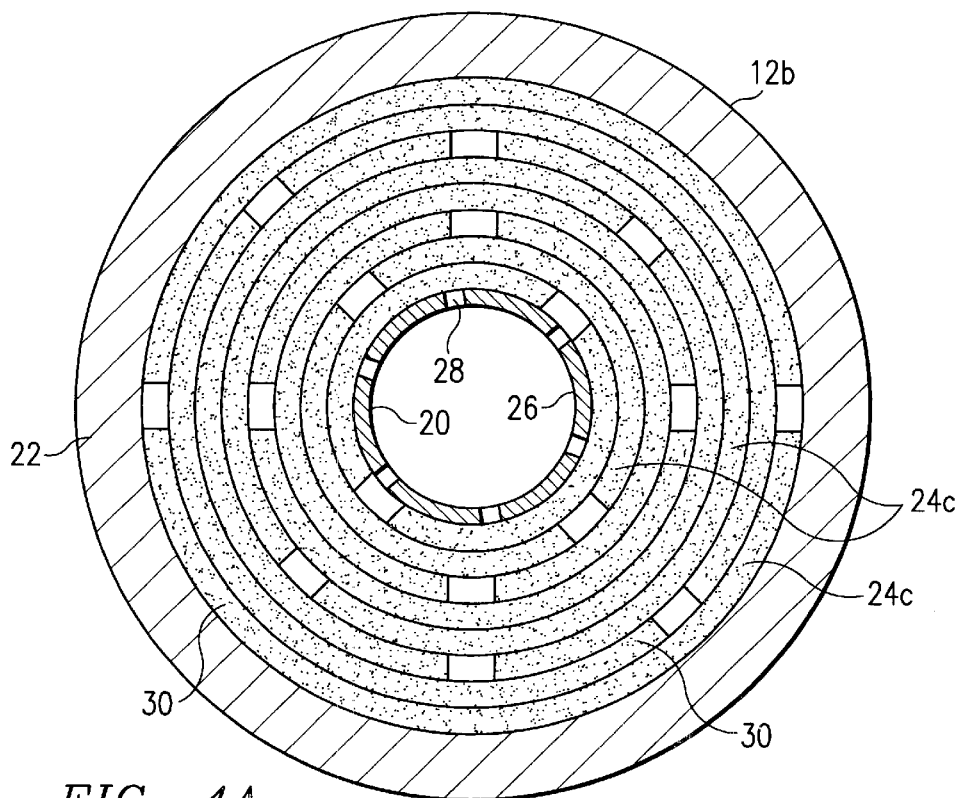
FIG. 4A is a cross sectional view of an armored spring-core superconducting cable in accordance with another embodiment of the present invention.
Figure 4B:
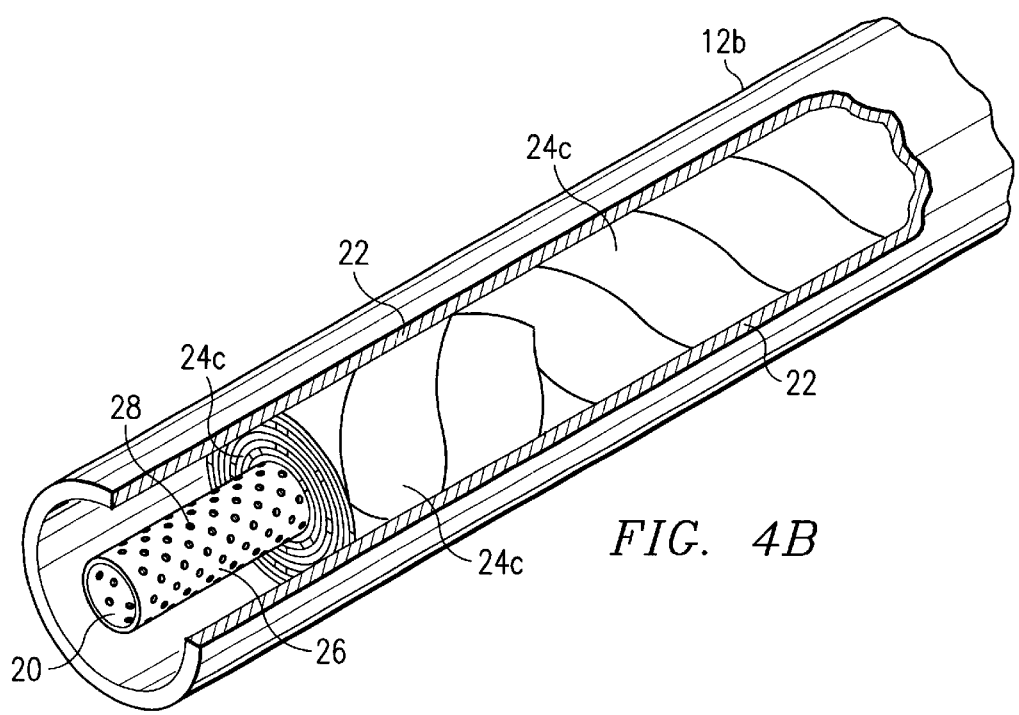
FIG. 4B is a perspective view of a schematic drawing in section with portions broken away illustrating the armored spring-core superconducting cable of FIG. 4A in accordance with the present invention.

FIGS. 4A and 4B illustrate an armored spring-core superconducting cable 12b in accordance with another embodiment of the present invention. The armored spring-core superconducting cable 12b is similar to the armored spring-core superconducting cable 12. The superconducting strands 24 associated with the armored spring-core superconducting cable 12b comprise a ribbon superconducting strands 24c. Ribbon superconducting strands 24c are generally formed by cold-rolling or hot-rolling a powder-in-tube assembly to form a sheet, or ribbon.

In the preferred embodiment of the armored spring-core superconducting cable 12b, at least two ribbon superconducting strands 24c are wound onto the spring-core 20 at a spiral pitch, in such a way that the two ribbon superconducting strands 24c enclose the circumference except for a small seam allowed for tolerance and/or cooling. Two more ribbon superconducting strands 24c are then wound onto the outer surface presented by the first two ribbon superconducting strands 24c at an opposite spiral pitch. Two more ribbon superconducting strands 24c can be wound onto the outer surface presented by these last two ribbon superconducting strands 24c at an opposite spiral pitch to the prior layer of ribbon superconducting strands 24c. The armored spring-core superconducting cable 12b may comprise as many layers of ribbon superconducting strands 24c as required for the particular application. The widths of each pair of ribbon superconducting strands 24c is gradually increased so that each pair incloses the circumference presented by the prior pair of ribbon superconducting strands 24c. Finally, the spring-core 20 and ribbon superconducting strand 24 assembly is inserted into a tube and drawn down to form the armored shell 22 around the ribbon superconducting strands 24c.

Although the present invention has been described with several embodiments, various changes and modifications may be suggested to one skilled in the art. It is intended that the present invention encompass such changes and modifications that fall within the scope of the appended claims.

What is claimed is:

1. An armored spring-core superconducting cable comprising:
   a spring-core;
   at least one superconducting strand disposed outwardly of the spring-core; and
   an armored shell encasing the superconducting strands.

2. The armored spring-core superconducting cable of claim 1, wherein the spring-core comprises a perforated tubular spring-core.

3. The armored spring-core superconducting cable of claim 1, wherein each superconducting strand comprises a ribbon superconducting strand.

4. The armored spring-core superconducting cable of claim 1, further comprising an insulation layer disposed between the armored shall and the superconductive strands.

5. The armored spring-core superconducting cable of claim 1, wherein the superconducting strand comprises a high temperature superconducting material.

6. The armored spring-core superconducting cable of claim 1, wherein the spring-core has a substantially circular cross-section.

7. The armored spring-core superconducting cable of claim 6, further comprising a conductive jacket disposed outwardly of the armored shell.

8. The armored spring-core superconducting cable of claim 1, wherein the spring-core has a substantially rectangular cross-section.

9. The armored spring-core superconducting cable of claim 8, further comprising a laminar spring disposed within the spring-core.

10. A superconducting coil for an electromagnetic device comprising:
    at least one armored spring-core superconducting cable wound around a core, and each armored spring-core superconducting cable comprises:
    a perforated tubular spring-core;
    at least one superconducting strand disposed outwardly of the spring-core; and
    an armored shell encasing the superconducting strands.

11. The superconducting coil of claim 10, wherein each superconducting strand comprises a ribbon superconducting strand.

12. The superconducting coil of claim 10, wherein the perforated tubular spring-core has a substantially rectangular cross-section.

13. The superconducting coil of claim 12, wherein the armored spring-core superconducting cable further comprises a laminar spring disposed within the spring-core.

14. The superconducting coil of claim 10, wherein the armored spring-core superconducting cable further comprises a conductive jacket disposed outwardly of the armored shell.

15. The superconducting coil of claim 10, wherein the electromagnetic device comprises an electric motor.

16. A method for constructing an armored spring-core superconducting cable comprising:
    providing a perforated tubular spring-core;
    winding at least one superconducting strand onto the perforated tubular spring-core;
    encasing the superconducting strands within an armored shell to form a superconducting cable; and
    heat treating the superconducting cable.

17. The method of claim 16, further comprising the step of forming a conductive jacket outwardly from the superconducting cable prior to heat treating the superconducting cable.

18. The method of claim 16, further comprising the step of forming the superconducting cable into a desired shape prior to heat treating the superconducting cable.

19. The method of claim 17, wherein forming the superconducting cable into a desired shape prior to heat treating the superconducting cable comprises forming the superconducting cable into a superconducting coil prior to heat treating the superconducting cable.

20. The method of claim 16, wherein the perforated spring-core has a substantially rectangular cross section.

21. An electromagnetic device having at least one armored spring-core superconducting cable comprising:

a perforated tubular spring-core;

at least one superconducting strand disposed outwardly of the spring-core; and an armored shell encasing the superconducting strands.

22. The electromagnetic device of claim 21, wherein the at least one armored spring-core superconducting cable forms, at least in part, a superconducting coil.

23. The electromagnetic device of claim 21, wherein each superconducting strand comprises a ribbon superconducting strand.

24. The electromagnetic device of claim 21, wherein the perforated tubular spring-core has a substantially rectangular cross-section.

25. The electromagnetic device of claim 21, wherein the electromagnetic device comprises an electric motor.

26. The electromagnetic device of claim 21, wherein the electromagnetic device comprises a magnetic resonance imaging system.

* * * * *